United States Patent
Li et al.

(10) Patent No.: US 7,809,128 B2
(45) Date of Patent: Oct. 5, 2010

(54) METHODS AND SYSTEMS FOR PER-SESSION TRAFFIC RATE POLICING IN A MEDIA GATEWAY

(75) Inventors: San-Qi Li, Plano, TX (US); Yen Shei, Plano, TX (US)

(73) Assignee: Genband US LLC, Plano, TX (US)

( * ) Notice: Subject to any disclaimer, the term of this patent is extended or adjusted under 35 U.S.C. 154(b) by 1547 days.

(21) Appl. No.: 11/032,592

(22) Filed: Jan. 10, 2005

(65) Prior Publication Data

US 2006/0077963 A1 Apr. 13, 2006

Related U.S. Application Data

(60) Provisional application No. 60/616,651, filed on Oct. 7, 2004.

(51) Int. Cl.
    H04L 12/66 (2006.01)
(52) U.S. Cl. .................... 379/354; 370/395.21
(58) Field of Classification Search ............... 370/392, 370/235, 239, 352–356
    See application file for complete search history.

(56) References Cited

U.S. PATENT DOCUMENTS

| | | | | |
|---|---|---|---|---|
| 6,049,549 A * | 4/2000 | Ganz et al. | .................. | 370/449 |
| 6,269,095 B1 * | 7/2001 | Neubauer et al. | ........... | 370/352 |
| 6,798,767 B1 * | 9/2004 | Alexander et al. | ......... | 370/352 |
| 6,865,185 B1 * | 3/2005 | Patel et al. | .................. | 370/412 |
| 6,879,820 B2 * | 4/2005 | Bjelland et al. | ............. | 455/406 |
| 6,950,874 B2 * | 9/2005 | Chang et al. | ................ | 709/229 |
| 7,209,473 B1 * | 4/2007 | Mohaban et al. | ............ | 370/352 |
| 7,424,025 B2 | 9/2008 | Qian et al. | | |
| 7,477,647 B2 * | 1/2009 | Choi et al. | .................. | 370/401 |
| 2003/0041146 A1 | 2/2003 | Davis et al. | | |
| 2003/0061363 A1 * | 3/2003 | Bahl et al. | .................. | 709/229 |
| 2005/0007954 A1 | 1/2005 | Sreemanthula et al. | | |
| 2005/0111382 A1 | 5/2005 | Le et al. | | |

OTHER PUBLICATIONS

International Search Report and Written Opinion of the International Searching Authority corresponding to PCT application No. PCT/US05/35890 dated Jul. 20, 2006.

Braden et al., "Resource ReSerVation Protocol (RSVP)—Version 1 Functional Specification," Network Working Group, RFC 2205 (Sep. 1997).

Braden et al., "Resource ReSerVation Protocol (RSVP)—Version 1 Functional Specification," Internet Draft, draft-ietf-rsvp-procrules-00.txt (Oct. 29, 1996).

* cited by examiner

Primary Examiner—Simon Sing
(74) Attorney, Agent, or Firm—Jenkins, Wilson, Taylor & Hunt, P.A.

(57) ABSTRACT

Methods and systems for per-session traffic rate policing in a media gateway include receiving voice over IP (VoIP) packets at a media gateway where it is determined whether each VoIP packet is associated with an existing VoIP session in the media gateway. A per-session traffic rate policing policy is applied to the packets associated with the existing sessions in the media gateway. In response to determining that a packet violates the per-session traffic rate policing policy, the packet is discarded.

31 Claims, 8 Drawing Sheets

METHODS AND SYSTEMS FOR PER-SESSION TRAFFIC RATE POLICING IN A MEDIA GATEWAY

RELATED APPLICATIONS

This application claims the benefit of U.S. Provisional Application No. 60/616,651 entitled "Media Gateway Features", filed Oct. 7, 2004, the disclosure of which is incorporated herein by reference in its entirety.

TECHNICAL FIELD

The subject matter described herein relates to communications and more particularly, to traffic rate policing in a media gateway.

BACKGROUND

In modern telephony networks, media switching and call control functionality are separated. Call control, which includes setting up and tearing down calls and maintaining call state machines, is performed by a network entity referred to as a media gateway controller (MGC). Media stream switching, which includes switching media packets between input and output ports and converting the media packets into the appropriate formats for the sending and receiving parties, is performed by a media gateway (MG). Media gateway controllers communicate call control information to media gateways via a media gateway control protocol. Typical media gateway control protocols, such as MGCP and MEGACO, include commands for communicating information about each endpoint of a session to the media gateway and instructing the media gateway as to how to process packets to be delivered to each endpoint.

FIG. 1 is a schematic diagram illustrating voice sessions between media gateways 100, 102, 104, and 106 interconnected through an IP network 108. Media gateways 100, 102, 104, and 106 may be connected through IP network 108 via multiple paths through a series of next-hop routers. Multiple bidirectional voice sessions may be set up between any two or more of media gateways 100, 102, 104, and 106. As voice packets are received at a media gateway (ingress packets) or exit the media gateway (egress packets), the particular session that a packet belongs to must be identified for proper delivery and/or processing of the packet. The process of assigning a packet to a particular session to which it belongs is commonly referred to as packet classification.

FIG. 2 is a schematic diagram illustrating an exemplary media gateway 200. Referring to FIG. 2, media gateway 200 includes a control module 202, a resource manager 204, a packet switch fabric 206, voice servers 208, and network interfaces 210. Each voice server 208 contains voice processing resources for processing voice-over-IP (VoIP) and time division multiplexed (TDM) voice streams. For example, each voice server 208 may include codecs, VoIP, asynchronous transfer mode (ATM), and TDM chips, and digital signal processing resources for processing VoIP streams. A detailed description of exemplary resources that may be found in voice server 208 can be found in commonly assigned, co-pending U.S. patent application Ser. No. 10/676,233, the disclosure of which is incorporated herein by reference in its entirety.

Control module 202 of media gateway 200 controls the overall operation of media gateway 200 and communicates with media gateway controller 212 to set up and tear down calls. Resource manager 204 of control module 202 allocates new voice sessions to incoming calls. For example, resource manager 204 may assign one of voice servers 208 to a session and store session information for the session in a session table 214 in a memory. Session table 214 is then regularly accessed to classify ingress and egress packets to the appropriate sessions. Although session table 214 is shown logically as a single entity, session tables 214 may actually be distributed among, and accessed by, network interfaces 210, as will be discussed further below.

Voice servers 208 are each assigned individual IP addresses and are each reachable through packet switch fabric 206 via any of network interfaces 210. Multiple sessions may be processed by the same voice server 208. Furthermore, multiple sessions may be established between a given network interface 210 and a given voice server 208 through the packet switch fabric 206. The traffic rate for a given voice server 208 should not be exceeded to avoid degrading the voice quality of calls, or worse, overloading the voice of server 208. For example, a malicious attack can be launched against a media gateway by flooding the media gateway with packets, thereby reducing the call handling capacity, or even overloading, one or more of voice servers 208. While firewall protection mechanisms provide some degree of protection against unauthorized users, voice servers 208 are still vulnerable to receiving excessive packets from authorized users, whether maliciously or unintentionally. For example, once a call is allowed into a media gateway, packets for the session pass through the firewall. If either the calling or the called party send an excessive amount of packets, conventional firewall protection mechanisms are ineffective for preventing these packets from overloading media gateway resources.

Accordingly, a need exists for traffic rate policing in a media gateway to limit a packet traffic rate available to authorized users.

SUMMARY

In one aspect of the subject matter disclosed herein, a method is disclosed for per-session traffic rate policing in a media gateway. VoIP packets are received at a media gateway where it is determined whether each VoIP packet is associated with an existing VoIP session in the media gateway. A per-session traffic rate policing policy is applied to the packets associated with the existing sessions in the media gateway. In response to determining that a packet violates the per-session traffic rate policing policy, the packet is discarded.

In another aspect of the subject matter disclosed herein, a system is disclosed for per-session traffic rate policing in a media gateway. The system includes a plurality of network interfaces for receiving VoIP packets at a media gateway and determining whether each VoIP packet is associated with an existing VoIP session in the media gateway and a plurality of voice server modules for receiving VoIP packets associated with existing sessions in the media gateway and for performing voice processing functions for the packets. The system also includes a packet switch fabric for connecting the voice server modules to the network interfaces and a control module for establishing connections between the network interfaces and the voice server modules via the packet switch fabric. At least one of the packet switch fabric and the network interfaces applies a per-session traffic rate policing policy for preventing packets associated with an existing session in the media gateway from exceeding a predetermined rate.

In another aspect of the subject matter disclosed herein, a system is disclosed for per-session traffic rate policing in a media gateway. The system includes logic configured to receive VoIP packets at a media gateway, logic configured to determine whether each VoIP packet is associated with an existing VoIP session in the media gateway, logic configured to apply a per-session traffic rate policing policy to the packets associated with the existing sessions in the media gateway, and logic configured to, in response to determining that a packet violates the per-session traffic rate policing policy, discard the packet.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION OF THE INVENTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Thus, the invention can be embodied in many different forms, and all such forms are contemplated to be within the scope of what is claimed. Any such form of embodiment can be referred to herein as "logic configured to" perform a described action, or alternatively as "logic that" performs a described action.

Figure 1:
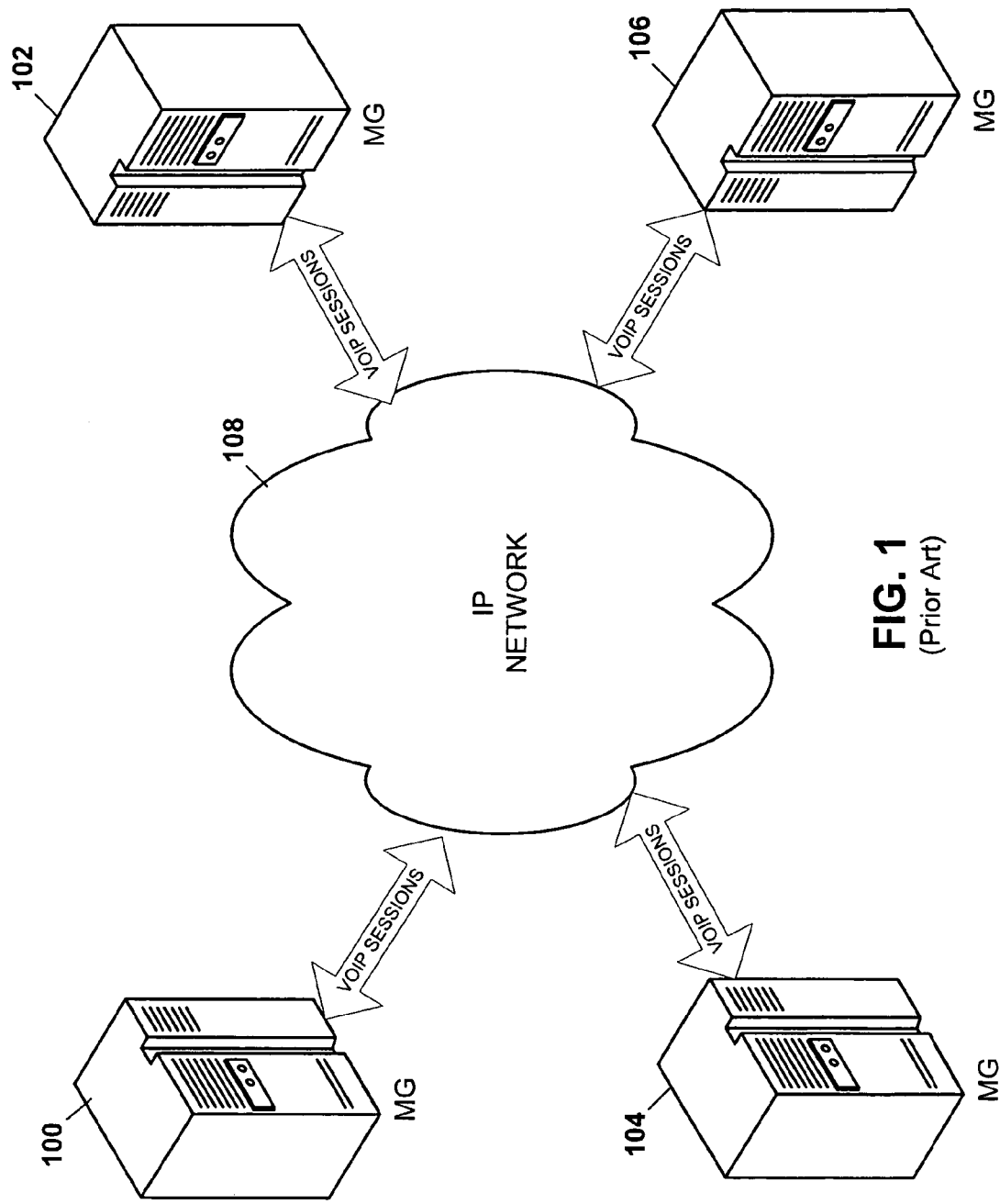
FIG. 1 is a schematic diagram illustrating voice sessions between media gateways interconnected through an IP network.
Figure 2:
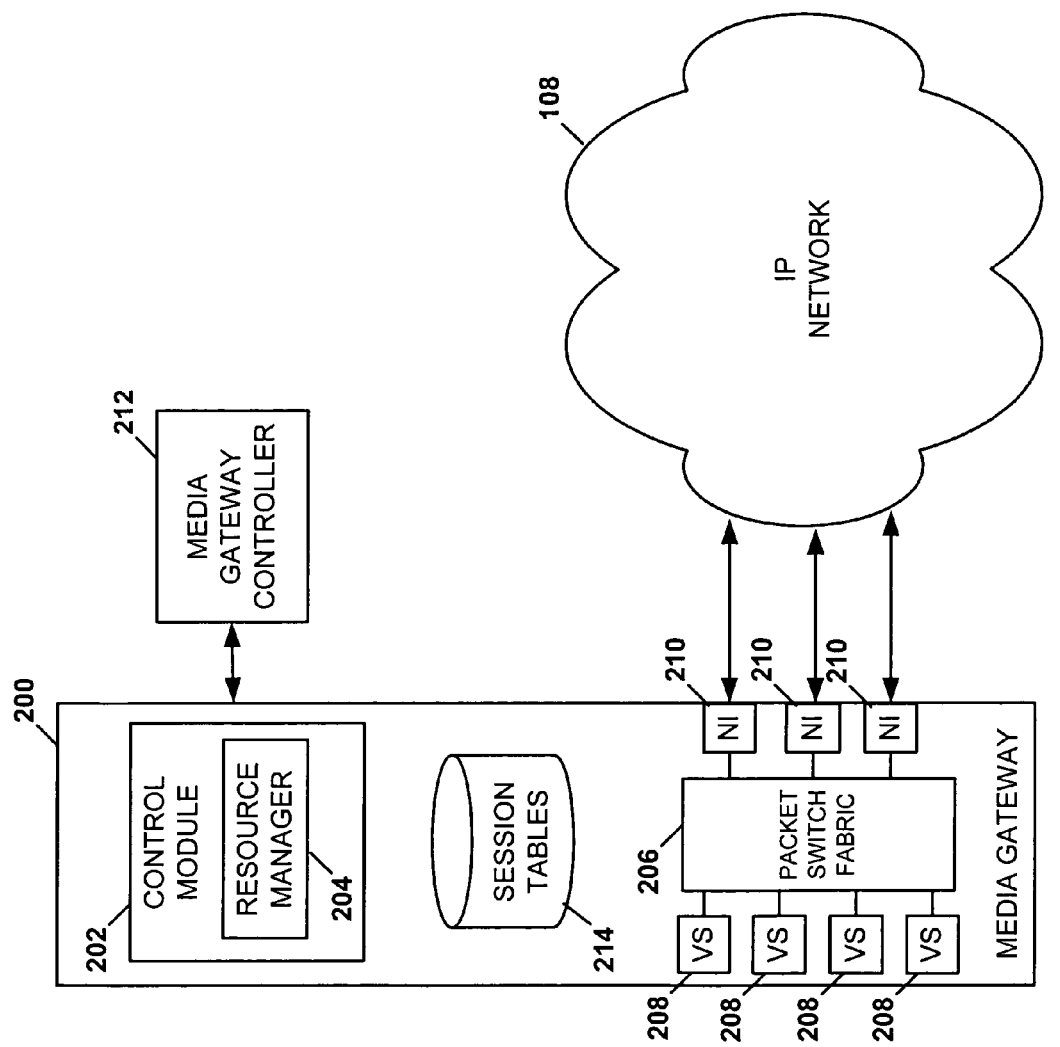
FIG. 2 is a schematic diagram illustrating a media gateway.
Figure 3:
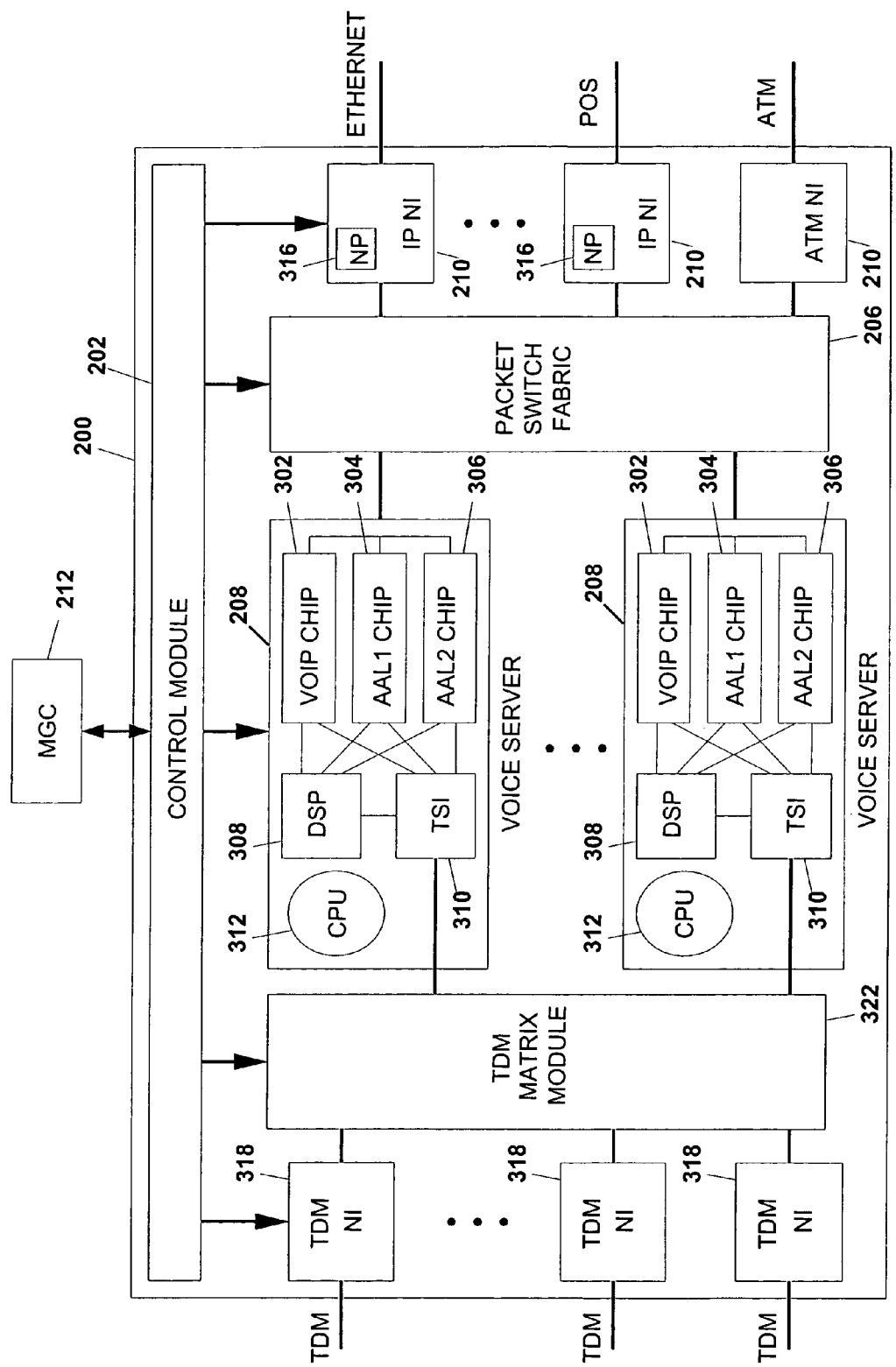
FIG. 3 is a schematic diagram illustrating an exemplary internal architecture for a media gateway.

FIG. 3 is a schematic diagram illustrating an exemplary internal architecture for media gateway 200 in more detail. In FIG. 3, media gateway 200 includes voice servers 208, which include various voice chips, including VoIP chips 302, voice-over-AAL1 chips 304, and voice-over-AAL2 chips 306. In addition, each voice server 208 includes some digital signal processors 308 (e.g. voice transcoders, echo cancellers, conference bridges, etc.), a time slot interconnection (TSI) 310, and a central processing unit (CPU) 312.

In the illustrated example, each voice chip 302 implements one or more VoIP protocols, such as Real time Transmission Protocol (RTP). Each voice chip 304 implements ATM Adaptation Layer 1 (AAL1) functions. Each voice chip 306 implements ATM Adaptation Layer 2 (AAL2) functions. DSP 308 provides transcoding, echo cancellation and other payload-transformation functions. TSI 310 makes on-demand connections between VoIP chip channels, TDM matrix channels, and DSPs. CPU 312 controls the overall operation of each voice server 208.

In addition to a plurality of voice servers 208, media gateway 200 includes a plurality of network interfaces 210. Each network interface 210 implements network layer functions and packet forwarding functions, such as IP forwarding functions. In the illustrated example, different network interfaces are provided to connect to external Ethernet, Packet-Over-SONET (POS), ATM, and MPLS networks.

In addition to packet-based network interfaces 210, media gateway 200 may also include TDM network interfaces 318. TDM network interfaces 318 send and receive voice frames from external TDM networks. TDM network interfaces 318 may implement any suitable physical layer protocols for sending and receiving voice frames over TDM links. For example, each TDM network interface 318 may terminate one or more TDM voice trunks.

In order to switch media packets between network interfaces 210 and voice servers 208, media gateway 200 includes a packet switch fabric 206. Packet switch fabric 206 routes packets between voice servers 208 and network interfaces 210 under the control of control module 202. As discussed above, packet switch fabric 206 may connect every network interface 210 to every voice server 208. In addition to packet switch fabric 206, gateway 200 may also include a TDM matrix module 322 for switching traffic that is carried in each TDM timeslot. TDM matrix module 322 is also controlled by control module 320. Control module 202 may communicate with media gateway controller 212 to dynamically allocate logical and physical resources for each session.

In operation, control module 202 receives a request for a new call/session. The request may be generated by media gateway controller 212 in response to a call setup message associated with a new call. The call setup message may be an ISUP IAM message, a PRI SETUP message, a SIP INVITE message, or any other suitable type of call setup message for initiating a call. Control module 202 assigns a voice server 208 and a voice chip to process the media stream for the session. Control module 202 also identifies the session with an entry in a session table 214. The session identifier includes a combination of IP addresses and UDP port numbers that is unique among current sessions, as will be described further below. The session identifier is preferably assigned to a voice chip for the duration of the session and is communicated to the remote end of a session by media gateway controller 212. The remote end of the session will then send subsequent media stream packets that are addressed according to the session identifier. Session tables 214 on each packet network interface 210 are updated under the control of control module 202 so that packets addressed according to the session identifier are forwarded to the appropriate voice chip.

Once resources, such as a voice chip, have been assigned to the session, media gateway 200 classifies packets having the same session identifier to the session. That is, packets are forwarded via the switch fabric 206 to and from the voice chip assigned to the session for voice processing. Exemplary operations that may be performed by the assigned voice chip may include segmentation and reassembly (SAR), echo cancellation, transcoding, DTMF detection, DTMF generation, announcement, conference bridging, Internet fax, and law enforcement. Once the voice packets associated with the session have been processed, the voice packets may be sent from the voice chip to one of network interface 210 or to a TDM network interface 318 for transmission to the remote end of a session. Once a session ends, the resources used may be assigned to a new session. An exemplary method for dynamically assigning resources to sessions suitable for use with the methods and systems described herein is described in commonly assigned, co-pending U.S. patent application Ser. No. 10/676,233, referenced above.

Figure 4:
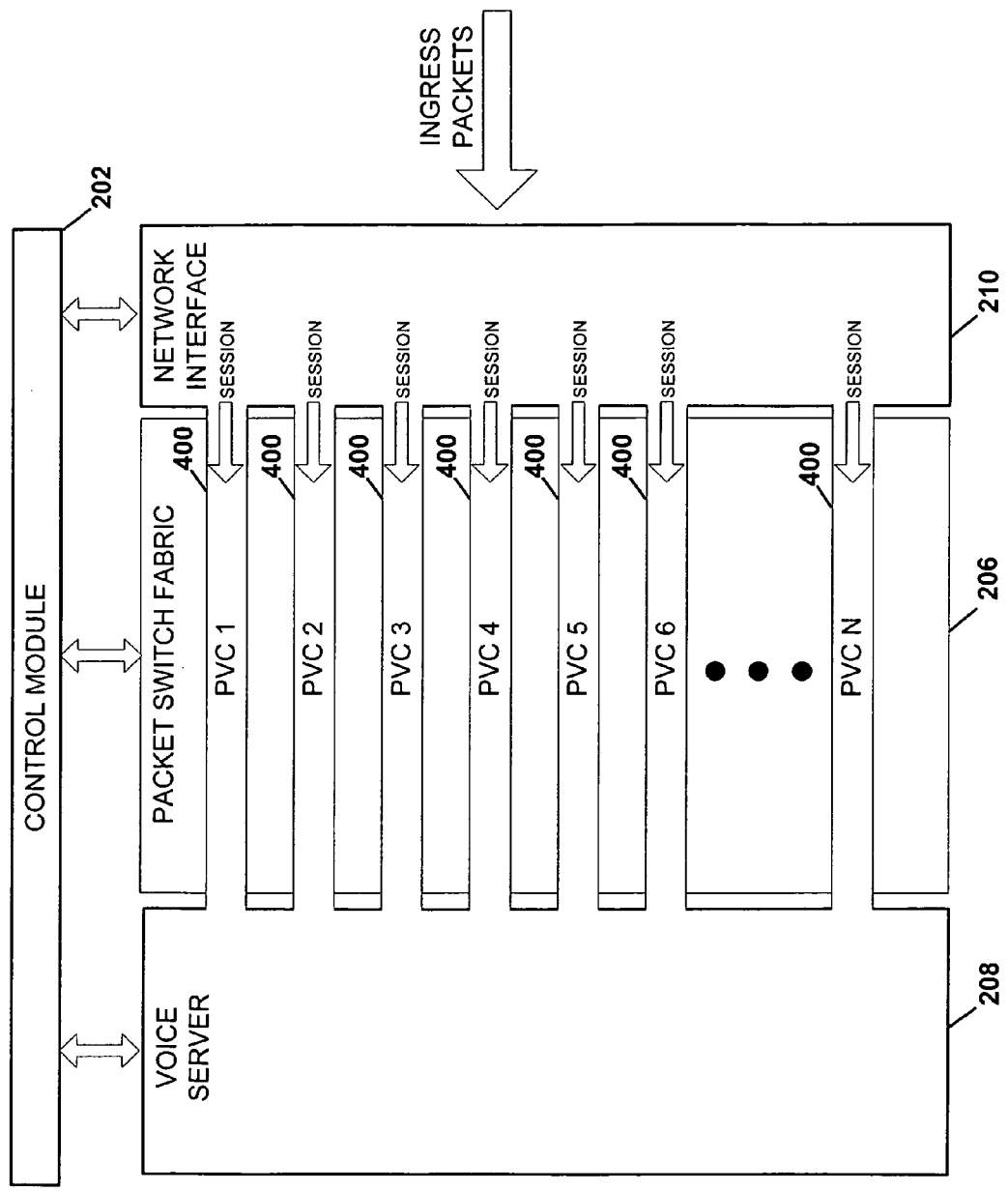
FIG. 4 is a schematic diagram illustrating traffic rate control according to an aspect of the subject matter described herein.

FIG. 4 is a schematic diagram illustrating traffic rate control according to an aspect of the subject matter described herein. In FIG. 4, incoming packets arrive at network interface 210. Network interface 210 classifies the packets to a session and forwards each packet through packet switch fabric 206 to one of voice servers 208 for processing. Multiple unidirectional paths or connections are established through packet switch fabric 206 between a given network interface 210 and voice server 208, where N is an integer that may be based on concurrent sessions that voice server 208 is expected to handle. For example, permanent virtual connections (PVC) based on asynchronous transfer mode (ATM) protocol may be established through packet switch fabric 206, as will be appreciated by one of ordinary skill in this art. In the example given by FIG. 4, N PVCs 400 are established between one network interface 210 and one voice server 208. It will be appreciated, however, that PVCs 400 may be established between multiple network interfaces 210 and the same voice server 208, and vice versa.

Each PVC 400 through packet switch fabric 206 may be set up in advance under the control of control module 202. The bandwidth allocated to a PVC 400 may be established to accommodate a single session. That is, enough bandwidth is allocated to support a maximum allowable traffic rate for a single session. For example, the bandwidth of each PVC 400 may be limited to allow a maximum traffic rate of 100 Kbps per session. Packets received in excess of the maximum traffic rate are discarded. Accordingly, if an excessive number of packets are received for a given session, then the additional packets are discarded before the respective voice server's 208 call handling capacity can be unnecessarily diminished, or overloaded, or the call quality is degraded in other sessions handled by voice server 208.

Alternatively, PVC 400 may be more tailored to the particular session for which it is established. For example, control module 202 may communicate with media gateway controller 212 during call setup to determine the attributes of a particular session, such as encoding and compression attributes. The traffic rate for the associated PVC 400 may be set according to the attributes of the session.

In either case, control module 202 may communicate with packet switch fabric 206 to set a per-session maximum traffic rate for a session by establishing a per-session bandwidth limited path, such as PVC 400, through switch fabric 206 to limit the maximum traffic rate for the respective session. If the traffic rate exceeds the value of the maximum traffic rate, then the excess packets are discarded. Since the traffic rate policing function is carried out predominantly by packet switch fabric 206 once established, processing overhead in control module 202 is minimized. It should be noted also that the traffic rate policing described above may be omitted for packets leaving media gateway 200 (egress packets), since egress traffic rates are set by each respective voice server 208.

Figure 5:
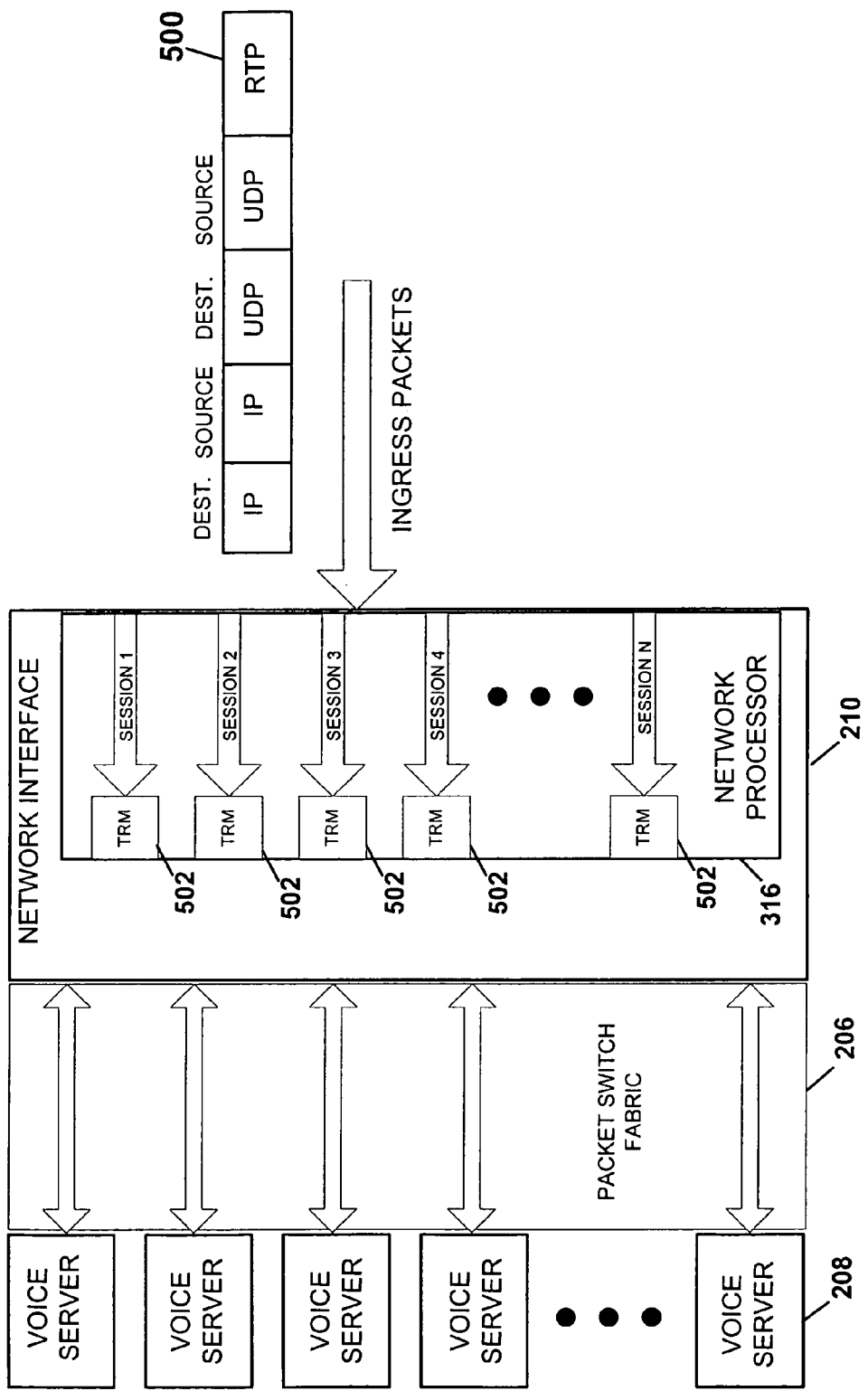
FIG. 5 is a schematic diagram illustrating traffic rate control according to another aspect of the subject matter described herein.

FIG. 5 is a schematic diagram illustrating traffic rate control according to another aspect of the subject matter described herein. In FIG. 5, incoming packets 500 arrive at network interface 210. Network interface 210 classifies the packets to a session and forwards each packet through packet switch fabric 206 to a respective voice server 208 currently processing packets for the respective session. Here, network processor 316 of network interface 210 includes one or more traffic rate monitors 502. Each traffic rate monitor 502 is assigned to a respective session and monitors the traffic rate for that session. Network processor 316 monitors the traffic rate for each session via traffic rate monitors 502 and discards packets that exceed a traffic rate threshold. The traffic rate threshold for each session may be set using either of the methods described above for setting traffic rates in PVCs. Namely, the traffic rate threshold may be set to a maximum value allowable for each of multiple sessions or to a traffic rate set according to the attributes of each session individually as determined during call setup between control module 202 and media gateway controller 212. When the traffic rate threshold is exceeded in a traffic rate monitor 502, this is an indication that an excessive number of packets have been received for a given session and additional packets are dropped before a respective voice server's 208 call handling capacity can be unnecessarily diminished, or overloaded, or the call quality is degraded in other sessions handled by a respective voice server 208.

Traffic rate monitors 502 may be implemented either internally or externally to network processor 316 using software or hardware methods as will be appreciated by one of ordinary skill of this art. For example, a counter may be used and the counter value may be a stored in a register or in any memory internal or external to network processor 316.

Network processor 316 determines which session each packet 500 received belongs to, i.e., classifies a packet, by analyzing the packet 500. For example, network processor 316 may read a source and destination IP address and a source and destination user datagram protocol (UDP) port number, or any subset combination of these values from packet 500 to determine which session the packet is associated with. As a packet is classified to a particular session, the associated traffic rate monitor 502 attributes the packet to the session for traffic rate monitoring purposes.

Figure 6:
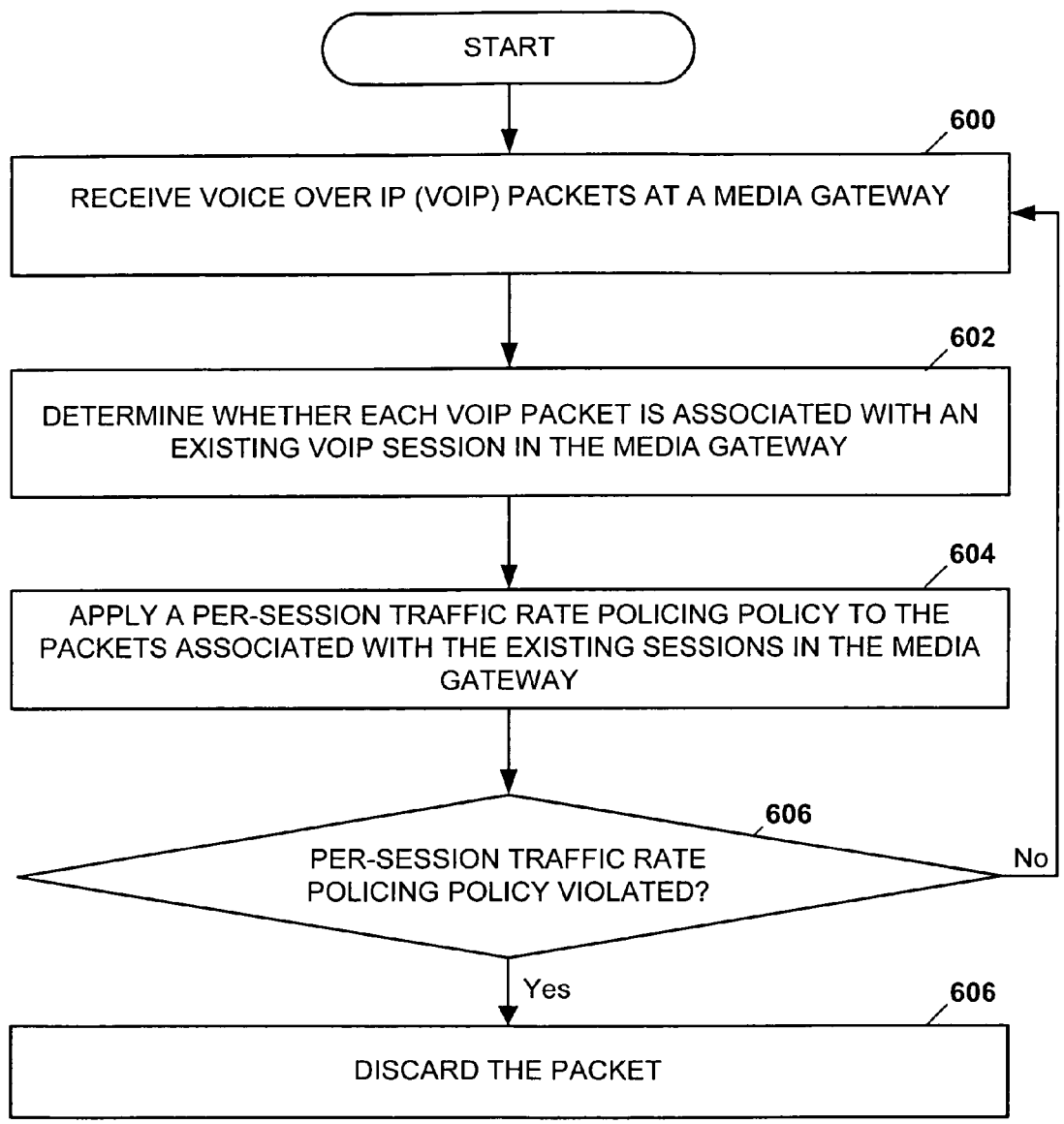
FIG. 6 is a flow chart illustrating a method for per-session traffic rate policing in a media gateway according to an aspect of the subject matter disclosed herein.

FIG. 6 is a flow chart illustrating a method for per-session traffic rate policing in a media gateway according to an aspect of the subject matter disclosed herein. In FIG. 6, VoIP packets are received at a media gateway in step 600. Network interface 210 determines whether each VoIP packet is associated with an existing VoIP session in the media gateway in step 602. A per-session traffic rate policing policy is applied to the packets associated with the existing sessions in the media gateway in step 604. In step 606, it is determined whether a packet violates the per-session traffic rate policing policy. In response to determining that a packet violates the per-session traffic rate policing policy, the packet is discarded in step 608. In response to determining that a packet does not violate the per-session traffic rate policing policy, the process returns to step 600.

Figure 7:
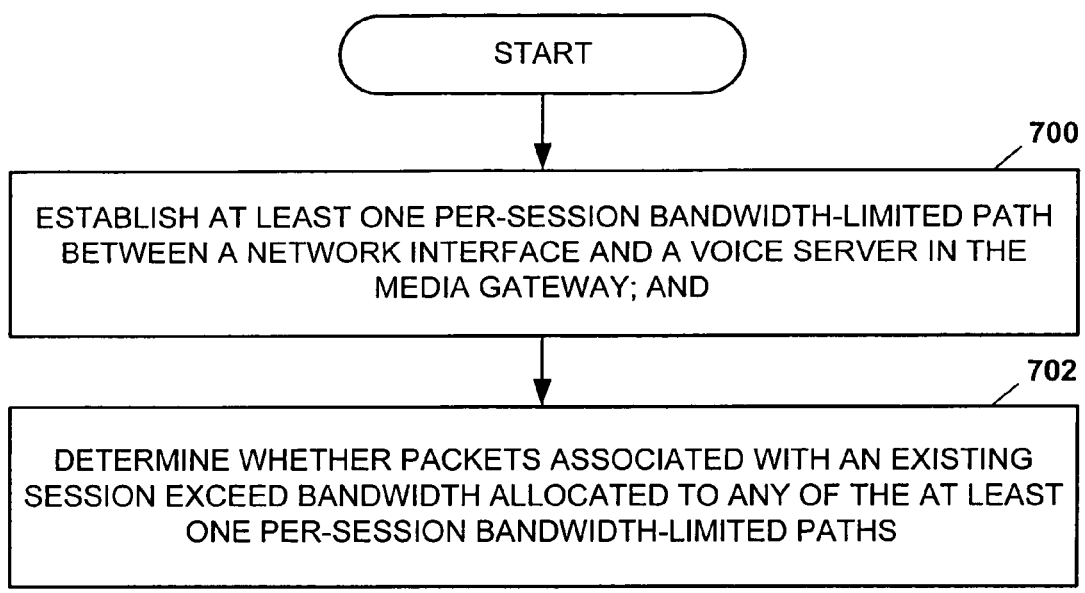
FIG. 7 is a flow chart illustrating one method of applying a per-session traffic rate policing policy to the packets according to an aspect of the subject matter disclosed herein.

FIG. 7 is a flow chart illustrating one method of applying a per-session traffic rate policing policy to the packets (step 604 in FIG. 6) according to an aspect of the subject matter disclosed herein. At least one per-session bandwidth-limited path established between a network interface and a voice server in the media gateway in step 700. Packet switch fabric 206 determines whether packets associated with an existing session exceed bandwidth allocated to any of the at least one per-session bandwidth-limited paths in step 702.

Figure 8:
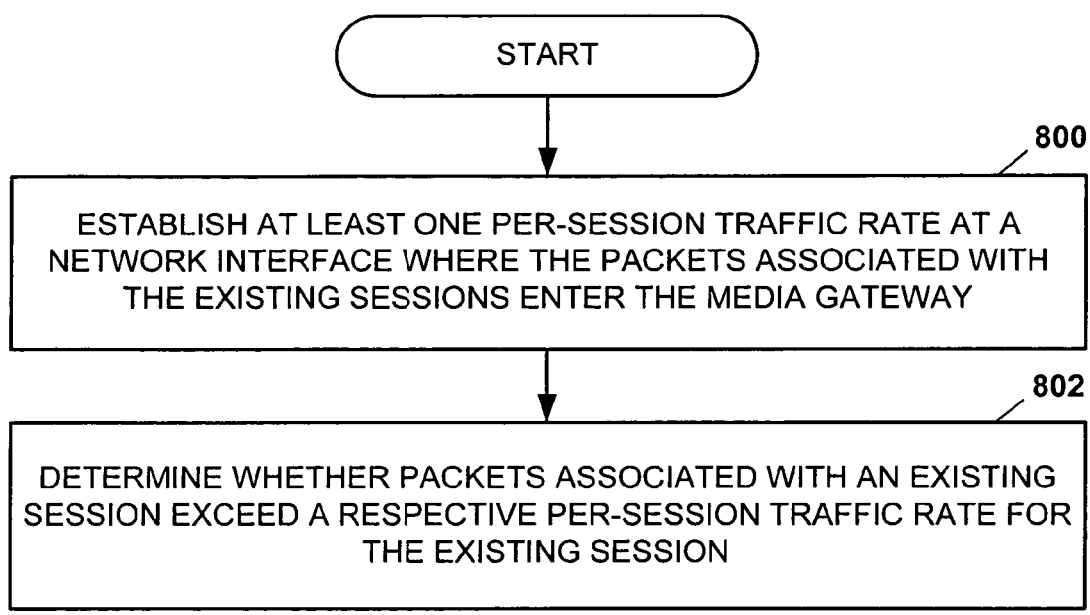
FIG. 8 is a flow chart illustrating another method of applying a per-session traffic rate policing policy to the packets according to another aspect of the subject matter disclosed herein.

FIG. 8 is a flow chart illustrating another method of applying a per-session traffic rate policing policy to the packets (step 604 in FIG. 6) according to another aspect of the subject matter disclosed herein. At least one per-session traffic rate at network interface 210 where the packets associated with the existing sessions enter the media gateway in step 800. Network processor 316 of network interface 210 determines whether packets associated with an existing session exceed a respective per-session traffic rate for the existing session in step 802.

Using either of the approaches described above, the per-session traffic rate policy is established. When that policy is violated, appropriate steps may be taken in the media gateway. For example, packets in excess of the per-session traffic rate established by the per-session traffic rate policy may be discarded as described above. In addition, in response to determining that a packet violates the per-session traffic rate policing policy, a session associated with the violating packet can be terminated at the media gateway. Another possible course of action responsive to determining that a packet violates the per-session traffic rate policing policy is to send an indication from the media gateway to a source of the violating packet, i.e., the corresponding subscriber, which conveys information to the subscriber. For example, the indication can inform a subscriber that excessive packets have been received in a session and that corrective measures were taken, such as discarding additional packets or terminating the session. In addition, a proactive approach to preventing future problems may be employed in response to determining that a packet violates the per-session traffic rate policing policy by limiting or banning other sessions involving the subscriber in the future at least until the source of the problem can be further investigated. For example, control module 202 can inform media gateway controller 210 to prevent establishment of other sessions involving the subscriber at a call signaling level. Yet another action that can be taken for packets that repeatedly violate the per-session traffic rate control policy is to add the source of IP address of the packet to a firewall maintained by the media gateway to prevent future packets from the source IP address from entering the media gateway.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for per-session traffic rate policing in a media gateway, the method comprising:

(a) receiving voice over IP (VoIP) packets at a media gateway that performs media switching and that is controlled by and for which call control and call control signaling is performed by a media gateway controller separate from the media gateway;

(b) determining, in the media gateway, whether each VoIP packet is associated with an existing VoIP session in the media gateway;

(c) applying, in the media gateway, per-session traffic rate policing policies to the packets determined to be associated with the existing sessions in the media gateway, wherein each per session traffic rate policing policy limits a traffic rate for packets received by the media gateway for a session that is being processed by the media gateway; and (d) in response to determining that a packet violates one of the per-session traffic rate policing policies, discarding the packet at a component within the media gateway.

2. The method of claim 1 wherein applying the per-session traffic rate policing policies to the packets comprises:

(a) establishing at least one per-session bandwidth-limited path between a network interface and a voice server in the media gateway; and (b) determining whether packets associated with an existing session exceed bandwidth allocated to any of the at least one per-session bandwidth-limited paths.

3. The method of claim 2 wherein establishing at least one per-session bandwidth-limited path comprises establishing the bandwidth-limited path through a packet switch fabric connecting the network interface and the voice server.

4. The method of claim 3 wherein establishing at least one per-session bandwidth-limited path comprises establishing a permanent virtual connection (PVC) through the packet switch fabric connecting the network interface and the voice server.

5. The method of claim 1 wherein applying the per-session traffic rate policing policies to the packets comprises:

(a) establishing at least one per-session traffic rate at a network interface where the packets associated with the existing sessions enter the media gateway; and (b) determining whether packets associated with an existing session exceed a respective per-session traffic rate for the existing session.

6. The method of claim 1 wherein applying the per-session traffic rate policing policies to the packets comprises applying the same traffic rate policing policy to multiple sessions.

7. The method of claim 1 wherein applying the per-session traffic rate policing policies to the packets comprises applying a traffic rate policing policy to each session that is based on attributes of the session determined during call setup.

8. The method of claim 1 comprising, in response to determining that a packet violates one of the per-session traffic rate policing policies, terminating a session associated with the violating packet.

9. The method of claim 1 comprising, in response to determining that a packet violates one of the per-session traffic rate policing policies, blocking packets from the same source as the violating packet.

10. The method of claim 9 wherein blocking packets from the same source as the violating packet includes adding an entry corresponding to the source of the violating packets to a firewall maintained by the media gateway.

11. The method of claim 9 wherein blocking packets from the same source as the violating packet includes preventing establishment of sessions from a source of the violating packet.

12. A method for per-session traffic rate policing in a media gateway, the method comprising:

receiving voice over IP (VoIP) packets at a media gateway that performs media switching and that is controlled by and for which call control and call control signaling is performed by a media gateway controller separate from the media gateway;

determining, in the media gateway, whether each VoIP packet is associated with an existing VoIP session in the media gateway;

applying, in the media gateway, per-session traffic rate policing policies to the packets determined to be associated with the existing sessions in the media gateway, wherein each per session traffic rate policing policy limits a traffic rate for packets received by the media gateway for a session that is being processed by the media gateway;

in response to determining that a packet violates one of the per-session traffic rate policing policies, discarding the packet at a component within the media gateway; and in response to determining that a packet violates one of the per-session traffic rate policing policies, sending an indication from the media gateway to a source of the violating packet.

13. A system for per-session traffic rate policing in a media gateway, the system comprising:

a media gateway that performs media switching and that is controlled by and for which call control and call control signaling is performed by a media gateway controller separate from the media gateway, the media gateway including:

(a) a plurality of network interfaces in the media gateway for receiving voice over IP (VoIP) packets at a media gateway and determining whether each VoIP packet is associated with an existing VoIP session in the media gateway;

(b) a plurality of voice server modules in the media gateway for receiving VoIP packets associated with existing sessions in the media gateway and for performing voice processing functions for the packets; and (c) a control module in the media gateway for establishing connections between the network interfaces and the voice server modules and for applying a per-session traffic rate policing policy for preventing packets determined by one of the network interfaces to be associated with an existing session in the media gateway from exceeding a predetermined rate.

14. The system of claim 13 wherein the control module comprises logic configured to establish at least one per-session bandwidth-limited path between a network interface and a voice server.

15. The system of claim 14 wherein the control module comprises logic configured to establish multiple per-session bandwidth-limited paths according to the same traffic rate policing policy.

16. The system of claim 13 wherein the control module comprises logic configured to establish per-session bandwidth-limited paths for each session based on attributes of the session determined during call setup.

17. The system of claim 13 comprising a packet switch fabric over which the control module establishes the connections between the network interfaces and the voice server modules.

18. The system of claim 17 wherein the per-session bandwidth-limited path is a permanent virtual connection (PVC) through the packet switch fabric.

19. The system of claim 17 wherein the packet switch fabric comprises logic configured to determine whether packets associated with an existing session exceed bandwidth allocated to any of the at least one per-session bandwidth-limited paths.

20. The system of claim 13 wherein the network interfaces comprise at least one network processor for applying the per-session traffic rate policing policy, each network processor having logic configured to:

(a) establish at least one per-session traffic rate at a network interface where the packets associated with the existing sessions enter the media gateway; and (b) determine whether packets associated with an existing session exceed a respective per-session traffic rate for the existing session.

21. The system of claim 20 wherein each network processor comprises logic configured to establish multiple traffic rates according to a same traffic rate policing policy.

22. The system of claim 20 wherein each network processor comprises logic configured to establish a per-session traffic rate for each session based on attributes of the session determined during call setup.

23. The system of claim 20 wherein the system comprises logic configured to apply the per-session traffic rate policing policy to discard packets that are in excess of the predetermined rate.

24. The system of claim 13 wherein the system comprises logic configured to apply the per-session traffic rate policing policy to terminate a session having a traffic rate exceeding the predetermined rate.

25. The system of claim 13 wherein the system comprises logic configured to block packets from a source of a session having a traffic rate exceeding the predetermined rate.

26. The system of claim 25 wherein the system comprises logic configured to add an entry corresponding to the source of the violating packet to a firewall maintained by the media gateway.

27. The system of claim 25 wherein the system comprises logic configured to prevent establishment of sessions from a source of the violating packet.

28. A system for per-session traffic rate policing in a media gateway, the system comprising:

a media gateway that performs media switching and that is controlled by and for which call control and call control signaling is performed by a media gateway controller separate from the media gateway, the media gateway including:

a plurality of network interfaces in the media gateway for receiving voice over IP (VoIP) packets at a media gateway and determining whether each VoIP packet is associated with an existing VoIP session in the media gateway;

a plurality of voice server modules in the media gateway for receiving VoIP packets associated with existing sessions in the media gateway and for performing voice processing functions for the packets;

a control module in the media gateway for establishing connections between the network interfaces and the voice server modules and for applying a per-session traffic rate policing policy for preventing packets determined by one of the network interfaces to be associated with an existing session in the media gateway from exceeding a predetermined rate; and logic configured to send an indication from the media gateway to a remote source of a session having a traffic rate exceeding the predetermined rate.

29. A system for per-session traffic rate policing in a media gateway, the system comprising:

(a) logic configured to receive voice over IP (VoIP) packets at a media gateway that performs media switching and that is controlled by and for which call control and call control signaling is performed by a media gateway controller separate from the media gateway;
(b) logic configured to determine in the media gateway whether each VoIP packet is associated with an existing VoIP session in the media gateway;
(c) logic configured to apply in the media gateway per-session traffic rate policing policies to the packets determined to be associated with the existing sessions in the media gateway, wherein each per session traffic rate policing policy limits a traffic rate for packets received by the media gateway for a session that is being processed by the media gateway; and
(d) logic configured to, in response to determining that a packet violates one of the per-session traffic rate policing policies, discard the packet at a component within the media gateway.

30. The system of claim 29 comprising logic configured to:
(a) establish at least one per-session bandwidth-limited path between a network interface and a voice server in the media gateway; and
(b) determine whether packets associated with an existing session exceed bandwidth allocated to any of the at least one per-session bandwidth-limited paths.

31. The system of claim 29 comprising logic configured to:
(a) establish at least one per-session traffic rate at a network interface where the packets associated with the existing sessions enter the media gateway; and
(b) determine whether packets associated with an existing session exceed a respective per-session traffic rate for the existing session.

* * * * *